March 25, 1969 D. J. BARCHOK 3,435,282

SELF-OSCILLATING DEFLECTION GENERATOR

Filed July 10, 1967

INVENTOR.
Donald J. Barchok
BY Nicholas A. Camasto
ATTY.

3,435,282
SELF-OSCILLATING DEFLECTION GENERATOR
Donald J. Barchok, Chicago, Ill., assignor to Admiral Corporation, Chicago, Ill., a corporation of Delaware
Filed July 10, 1967, Ser. No. 652,120
Int. Cl. H01j 29/70
U.S. Cl. 315—27 16 Claims

ABSTRACT OF THE DISCLOSURE

A vertical sawtooth deflection generator having its ramp voltage developed by the discharge of a capacitor. The effective discharge time of the capacitor is lengthened by feeding back a portion of the output voltage thereto.

Figure 1:
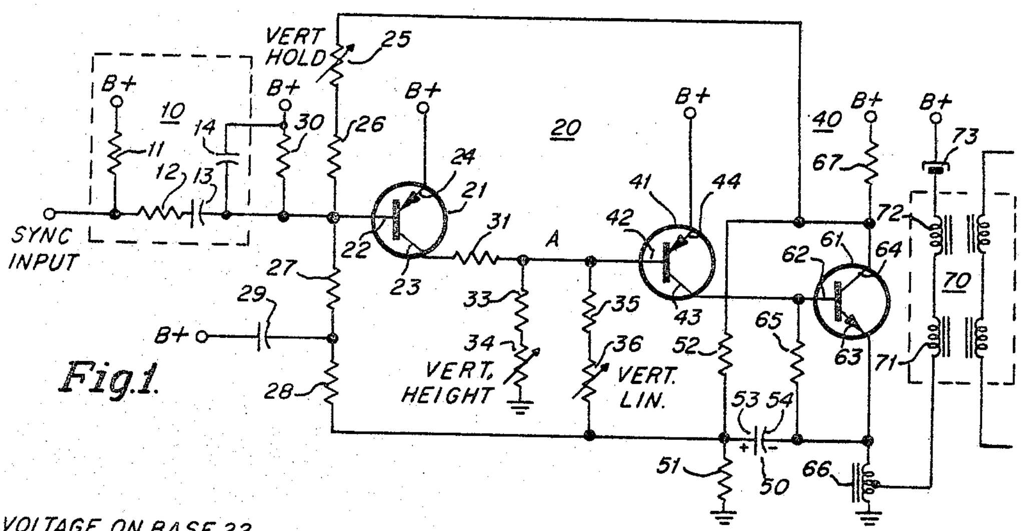

Transistorized sawtooth deflection generators for television receivers are well known in the art. In general, these circuits have required large value capacitors for producing the necessary sawtooth "ramp" or trace voltage. In practice, the large capacitor (or capacitors) are subjected to charging currents which provide the basis for the trace portion of a sawtooth waveform. At the end of the trace portion, the capacitor is rapidly discharged to enable it to again be available for charging at the beginning of the next trace portion.

In the invention, the ramp of the sawtooth is developed from the discharge of a capacitor and the capacitor is charged during the retrace period. Further, by coupling the capacitor to the output circuit, the potential on one of its plates is elevated as the output ramp voltage develops, thus effectively adding charge to the capacitor as it is being discharged. This has the result of lengthening the discharge time and, consequently, providing for a more linear discharge rate. With the invention, a small capacitor performs adequately compared with prior circuits requiring capacitors of several microfarads. As the capacitor in the circuit is small, it needn't be of the electrolytic type—which avoids all of the problems associated with such capacitors, especially when used in wave forming circuits.

Accordingly, the principal object of this invention is to provide a novel self-oscillating deflection generator.

Another object of this invention is to provide a transistorized vertical deflection generator utilizing capacitors of small value.

A further object of this invention is to provide a transistorized vertical oscillator wherein the development of the trace portion of the output waveform is controlled by the discharge of a capacitor.

A still further object of this invention is to provide a novel transistorized self-oscillating vertical deflection generator utilizing a single capacitor of small value.

Further objects and advantages of this invention will become apparent to those skilled in the art by a reading of the specification in conjunction with the drawing in which:

FIG. 1 is a partial schematic diagram of a portion of a television circuit employing the invention; and FIGS. 2A–2H consist of pictorial representations of waveforms of voltage and current at indicated points of the circuit.

For purposes of description, it will be assumed that the reader has a rudimentary knowledge of present day television theory, and consequently, ancillary details of the television receiver operation will not be given.

To the left of the circuit of the invention is a dashed line box 10 including a terminal connected to B+, a pair of resistors 11 and 12 and a pair of capacitors 13 and 14. The input to this box is labeled SYNC INPUT and the output is coupled to the input of a control circuit 20. Dashed line box 10 is a synchronizing signal processing circuit (vertical sync pulse integrator) wherein the vertical pulses in the synchronizing signal chain of horizontal, vertical and equalizing pulses are selected and integrated to produce vertical output timing pulses.

Control circuit 20 includes a switching transistor 21 having a base electrode 22, a collector electrode 23 and an emitter electrode 24. Emitter electrode 24 is connected to a source of B+ potential, and collector electrode 23 is connected to a source of ground potential through a series array of resistors 31, 33 and 34. Resistor 34 is indicated as being variable and labeled VERT. HT. indicating that in a commercial television receiver, this would be a serviceman adjustable control for varying the effective television picture size in the vertical direction by controlling the amplitude of the trace current. A resistor 30 is connected between base electrode 22 and a source of B+ for providing bias. A pair of other circuits connected to base electrode 22 will be described below.

The output of switching transistor 21 is coupled to the input of the first of a pair of drive transistors 41 and 61 in drive circuit 40. Transistor 41 includes a base electrode 42, a collector electrode 43 and an emitter electrode 44 which is connected to B+. Base 42 is connected to ground through a series of resistors 35, 36 and 51, resistor 36 being indicated as variable and labeled VERT. LIN. and being another serviceman adjustable control for controlling the voltage at the start of scan at the base of transistor 41 which is used to compensate for picture crushing or expansion, primarily at the top of the picture. Collector electrode 43 is DC coupled to base electrode 62 of second drive transistor 61. Collector 64 of transistor 61 is connected to B+ through a resistor 67 and emitter 63 is connected to ground through an impedance 66. (It will be understood that while impedance 66 is shown as an autotransformer, it may take other forms.) Base 62 and emitter 63 are connected via a resistor 65. Capacitor 50 having a normally positive plate 53 and a normally negative plate 54 is connected between resistor 51 and impedance 66. The dashed line box 70 indicates a yoke or magnetic deflection means having a number of coils, for example, coils 71 and 72 connected in the output circuit of transistor 61. As shown, coils 71 and 72 are serially interposed, along with electrolytic capacitor 73, between B+ and impedance 66.

A resistor 52 connects collector 64 to resistor 51, and thus, a voltage divider from B+ to ground is established. This voltage divider consists of resistors 67, 52 and 51. A DC feedback circuit is connected from drive transistor 61 to switching transistor 21 and includes resistors 25 and 26 interconnecting collector 64 of transistor 61 and base 22 of transistor 21. As shown, resistor 25 is variable and is labeled VERT. HOLD which may be a viewer operated control for bringing the deflection generator frequency into synchronization with the vertical timing pulses developed from the synchronizing pulses in the transmitted television signal. A second feedback path exists from positive plate 53 of capacitor 50 to base 22 of transistor 21 and includes a pair of resistors 27 and 28. The junction of these resistors connect to a source of B+ through a capacitor 29.

Briefly, switching transistor 21 is normally nonconductive and by means to be described, the base of first drive transistor 41 is supplied with a sawtooth shaped voltage tending to drive transistor 41 more heavily conductive during the trace portion. The trace portion is, therefore, negative going to progressively increase the forward bias on the base-emitter of transistor 41. Transistor 41 and transistor 61, while of opposite polarity, are merely amplifiers and may be considered as a single transistor. Hence, the output circuit of transistor 61 includes a sawtooth voltage of increasing magnitude for coupling to the deflection yoke. By co-operation between the two feedback paths, at a certain point transistor 21 is driven conductive and, in turn, cuts off transistors 41 and 61. Hence, the output current of transistor 61 is terminated and the energy stored in the magnetic field in the deflection yoke is rapidly released giving rise to a large retrace voltage pulse of opposite polarity across impedance 66, which drives transistor 21 into complete saturation and also heavily charges capacitor 50. When the retrace pulse expires, transistor 21 is again driven nonconductive by the action of the feedback paths.

Figures 2A, 2B, 2C, 2D, 2E, 2F, 2G, 2H:
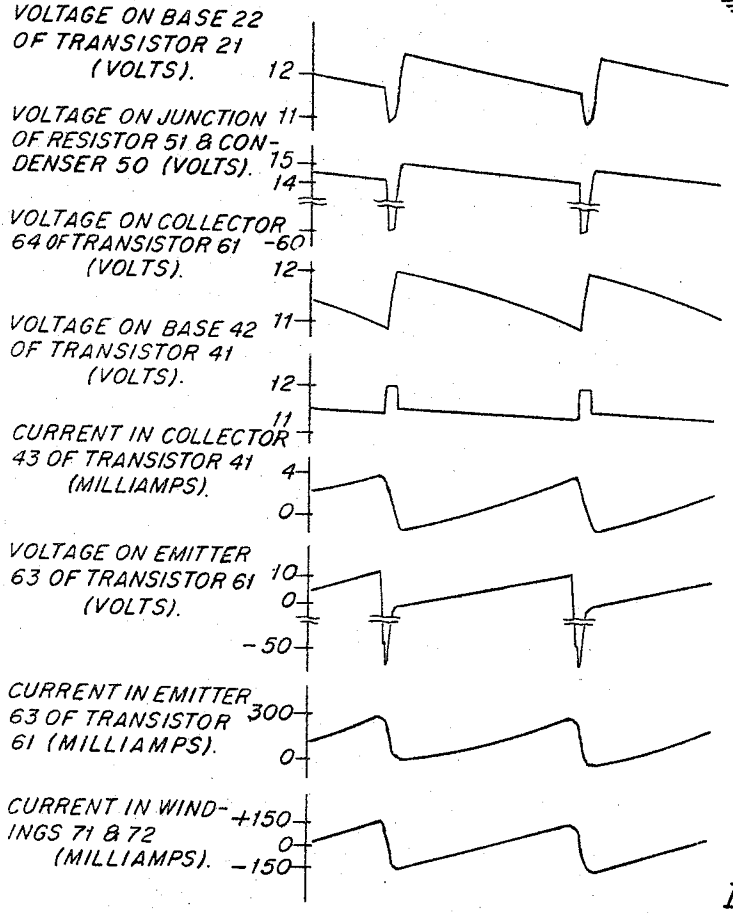

Referring to FIGS. 2*a*–2*h* in conjunction with the schematic of FIG. 1, assume that the circuit is in operation during the latter part of a trace interval. The voltage on base 22 of switching transistor 21 (FIG. 2*a*) is seen to be diminishing, but is still not sufficiently low to allow transistor 21 to conduct. With silicon type transistors, approximately a 0.6 volt differential is required across the emitter-base junction. This voltage is a combination of the potentials fed back from the junction of capacitor 50 and resistor 51, and from collector 64 of transistor 61 (FIGS. 2*b* and 2*c*). The development of these potentials will be discussed shortly. Suffice it to say that at some point, the voltage on the base of transistor 21 falls sufficiently below the emitter voltage (B+) to allow conduction in this transistor. When transistor 21 is conducting during retrace, the potential on base 42 of transistor 41 is determined by the potential on the collector of transistor 21. During trace intervals, this potential is determined by the discharge of capacitor 50. As seen in FIG. 2*d*, the potential exhibits a very slight decay in sawtooth fashion. The voltage variation is amplified and produces a large sawtooth shaped current in the transistor output circuit (FIG. 2*e*). Since collector 43 of transistor 41 is connected to base 62 of transistor 61 and both transistors are of opposite conductivity type, further amplification takes place. FIG. 2*f* indicates the voltage of emitter 63, FIG. 2*g*, its current and FIG. 2*h* the current in the yoke windings 71 and 72. During the trace interval, the voltage on collector 64 of transistor 61 (FIG. 2*c*) begins at supply level and decreases in magnitude in a substantially sawtooth manner, with a parabolic component imposed by inductance 66. During the retrace interval, the voltage on collector 64 rises abruptly to B+. Resistors 25 and 26 along with resistors 27 and 28 form a voltage divider for the voltage fed back from collector 64 and the voltage fed back from the junction of resistor 51 and capacitor 50. The resistance of these resistors is selected so that the voltage appearing on base 22 of switching transistor 21 is sufficient during the trace interval to maintain the base-emitter junction of this transistor in a reverse biased state.

When the combined feedback voltages to the base of transistor 21 lower the base potential sufficiently below its emitter, transistor 21 is driven conductive and its collector rapidly rises toward B+. As collector 23 goes positive, it cuts off transistor 41 by raising base 42 to B+. Collector 43 swings negatively and transistor 61 is cut off. When transistor 61 ceases to conduct, it stops supplying current to the yoke and the stored energy in the magnetic field of the yoke is released, generating a retrace voltage pulse. The amplitude of the retrace pulse is quite substantial and the pulse is coupled, through capacitor 50, to transistor 21, rapidly driving this transistor into heavy saturation. Transistor 21 current flows in both its base-emitter and in its collector-emitter circuits. When the retrace pulse terminates, transistor 21 is driven out of conduction by the charge sustained on capacitor 50.

One of the charging paths for capacitor 50 extends from B+ over emitter 24, collector 23, resistor 31 and resistors 35 and 36, capacitor 50 and impedance 66. The other charging path extends from B+ over emitter 24, base 22, resistors 27 and 28, capacitor 50 and impedance 66. The total resistance of resistors 27 and 28 and the total resistance of resistors 31, 35 and 36 are relatively small so that the charging time constant for capacitor 50 is relatively short.

At the end of the retrace pulse, the voltage developed across capacitor 50 is higher than B+ potential, due to the pulse current which flowed in transistor 21. This voltage is used to drive transistor 21 nonconductive after the retrace pulse and to hold it cut off during the trace interval.

The discharge path for capacitor 50 includes a series array of resistors 33–36 having a control terminal A connected to the base of transistor 41. The voltage on capacitor 50, stepped down by this resistive voltage divider arrangement, is applied to the base of transistor 41, which is connected to control terminal A. The voltage changes on control terminal A, during trace, in the direction of increasing conductivity. The normal discharge of capacitor 50, which is determined by the time constant of its discharge circuit, is somewhat non-linear. In the circuit of the invention, however, charge is being replaced on the negative terminal of capacitor 50 during discharge which has the effect of prolonging its discharge time and linearizing its rate of discharge. This is accomplished by connecting plate 54 to the emitter of second drive transistor 61. (It was seen in FIG. 2*f* that the voltage on emitter 63 rises during the trace interval.) Thus, the connection to plate 54 of the capacitor to a source of rising voltage during the trace interval impedes the discharge of capacitor 50 and makes it possible to use a capacitor of relatively small value while still achieving a slow rate of discharge. The rate of discharge of the capacitor determines the rate at which the voltage at control point A (base 42 of transistor 41) decreases The magnitude of resistors 33 and 34 also assist in producing a longer discharge time constant. Thus, the combination of providing a discharge path of high resistance and the provision of a rising voltage on plate 54 of capacitor 50 enables capacitor 50 to be relatively small so that a large electrolytic is not required.

The trace interval extends until the voltage on the base of transistor 21 falls to the point where this transistor is driven into conduction. Thereafter, the retrace interval is initiated and the oscillatory cycle is repeated.

The system is thus seen to be self-oscillating. However, for use in television receivers, the self-oscillations must be brought into synchronism with the scanning system of the transmitter. Consequently, synchronizing signal processing circuit 10 is designed to provide a negative pulse at appropriate intervals for effecting proper vertical synchronization. Hence, the start of conduction in transistor 21 no longer is solely dependent upon the combination of voltages fed back to it along the two previously described feedback paths, but is locked in step with the occurrence of the vertical synchronizing pulses. The provision of vertical hold control 25 in the DC feedback loop enables the user to select, over a given range, the exact moment when the combination of feedback voltages and synchronizing pulse applied to base 22 will trigger transistor 21 into conduction. In this way, the start of each oscillatory cycle is adjusted to correspond to the vertical synchronizing rate.

It has been seen that when transistor 21 is conductive, two separate charge paths for capacitor 50 exists. One of these paths extends over the impedance 66, capacitor 50, resistors 28 and 27 and the base-emitter junction of transistor 21. The other extends over impedance 66, capacitor 50, resistors 36, 35, 31 and the collector-emitter junction of transistor 21. Capacitor 50 is performing double duty in this circuit in that it not only develops the higher than B+ potential necessary to maintain transistor 21 nonconductive during the trace interval, but also develops the ramp or sawtooth voltage used to control conduction in transistor 41 and, hence, development of the sweep current in the yoke. It seems relatively clear that two capacitors may be substituted for capacitor 50 by separating the two above mentioned functions, although obvious advantages reside in using only one capacitor.

As mentioned previously, the connection of capacitor 50 in a feedback loop between drive transistors 61 and 41 inhibits discharge of the capacitor and makes it possible to use a relatively small capacitance to achieve the development of the ramp voltage. It also linearizes the output of these transistors.

Vertical height control 34 is in the discharge path of capacitor 50 and may be adjusted to affect the rate of discharge of the capacitor. Adjustments in this resistance change the slope of the variable voltage waveform on base 42 of transistor 41, effectively changing the amplitude of the sweep current in the yoke, and the height of the reproduced picture on the television screen. Vertical linearity resistor 36 is also adjustable for affecting the voltage on base 42, especially at the beginning of the trace interval. If the transistor 41 just begins to turn on at the beginning of the trace interval, good linearity should result and it is possible, by adjusting vertical linearity resistor 36, to match the voltage on base 42 at the start of trace with emitter-base cutoff voltage for the transistor. More simply stated, changing the resistance in the circuit causes more or less pulse component to appear at the base of the transistor 41 for achieving controllable starting characteristics for transistor 41.

An ever present problem when using transistor in circuits subjected to high voltage pulses (such as deflection circuits) is that of transistor transient voltage protection. In the instant circuit during the retrace interval, a large voltage appears across transistor 61, which transistor 61 must be able to withstand. The rate at which the yoke current is turned off determines the amplitude of the retrace voltage developed. Consequently, a small resistor 31 has been placed between collector 23 of transistor 21 and base 42 of transistor 41. This resistor functions as follows. As transistor 21 is turned on, transistors 41 and 61 are turned off and a retrace voltage pulse begins to form. The pulse is communicated back to transistor 21 to quickly drive it into saturation. It will be recalled that heavy current due to the pulse flows along two paths of transistor—from the base to the emitter and from the collector to the emitter. Current in the latter path traverses resistor 31 and develops a voltage drop which, when subtracted from B+ potential, is sufficient to momentarily turn transistor 41 on. Transistor 41, in being driven conductive, turns on transistor 61 which causes current to flow during retrace and the full development of the retrace pulse is thus impeded. Effectively, a form of "dynamic braking" is used consisting of turning transistor 61 on during retrace to inhibit development of an overly large retrace voltage pulse. This has the laudable effect of minimizing the voltage stress across transistor 61 which affects both cost and reliability.

In a practical circuit, resistor 30 may comprise a device such as a thermistor which changes resistance as an inverse function of temperature. As switching transistor 21 rises in temperature, its base cutoff characteristic tends to decrease and the tendency is for the frequency of oscillation of the circuit to increase. Providing a temperature variable resistor 30 offsets this tendency. Similarly, as yoke 70 experiences a temperature rise, its resistance increases and the linearity of the system is affected. By making resistance 52 temperature variable, this effect may be offset.

It should be understood that the particular arrangement of component parts in the circuit illustrating the invention is intended for illustrative purposes and other arrangements will readily occur to those skilled in the art without departing from the true spirit and scope of the invention as set forth in the claims.

The embodiments of the invention in which an exclusive property or privilege is claimed are defined as follows:

1. A self-oscillating scanning generator for developing in a magnetic deflection yoke a substantially linear sawtooth waveform of current having a long trace interval and a short retrace interval comprising: a first source of reference voltage; a capacitor; control circuit means providing a portion of a charge path for said capacitor during each retrace interval and a portion of a discharge path for said capacitor during each trace interval; said control circuit means including a control terminal supplied with a first voltage from said first reference source during each retrace interval and a gradually varying voltage as said capacitor discharges during each trace interval; and drive circuit means, coupled to said control terminal and operative in response to said gradually varying voltage to produce a varying trace current in said magnetic deflection yoke during each trace interval and being disabled by said first voltage to produce a retrace current in said magnetic deflection yoke during each retrace interval; said drive circuit means including impedance means providing the remainder of said charging and dischargng paths for said capacitor and developing a varying voltage during each trace interval to reduce the rate of discharge of said capacitor.

2. Apparatus as claimed in claim 1 and including a second source of reference potential, wherein said control circuit means further includes: a relatively low resistance path connecting said control terminal with said capacitor; a relatively high resistance path connecting said control terminal to said second source of reference potential; and switching circuit means for connecting said control terminal to said first source of reference potential during each retrace interval to provide said first voltage thereon.

3. Apparatus as claimed in claim 2, wherein said switching circuit means comprises: a switching transistor having base, emitter, and collector electrodes; said emitter electrode being connected to said first source of reference potential and said collector electrode being connected to said control terminal; and biasing circuit means including a pair of feedback paths from said drive circuit means to said base electrode cooperatively operable to maintain said transistor in an OFF condition during each trace interval and to switch said transistor to an ON condition during each retrace interval.

4. Apparatus as claimed in claim 3, wherein said drive circuit means comprises: first transistor means operative to produce a gradually varying output current in response to said gradually varying voltage on said control terminal during each trace interval and being disabled by said first voltage on said control terminal during each retrace interval; and second transistor means operative to amplify said output current of said first transistor and to supply said amplified current to said magnetic deflection yoke, said second transistor means including an amplifying transistor having an input electrode receiving said gradually varying output current and first and second output electrodes having said amplified current therein, said first output electrode being connected to said capacitor and being coupled to said magnetic deflection yoke and said second source of reference potential by way of said impedance means, said second output electrode being connected by way of a load resistor to said first source of reference potential, said first electrode having a gradually varying voltage thereon during each trace interval and an oppositely poled retrace voltage pulse thereon during each retrace interval, said second electrode thereby having a voltage thereon during each trace interval varying oppositely to said varying voltage on said first electrode.

5. Apparatus as claimed in claim 4, wherein said pair of feedback paths from said drive circuit means to said base electrode comprises: a direct current feedback path including at least one resistor connected between said base electrode of said switching transistor and said second electrode; an alternating current feedback path including at least one resistor and one capacitor series-connected in the mentioned order between said base electrode of said switching transistor and said first electrode; said alternating current feedback path coupling said retrace voltage pulses to the base electrode of said switching transistor and the base-emitter circuit of said switching transistor passing said retrace voltage pulses to provide a current for charging said capacitor in said path to a voltage which tends to reverse bias said base-emitter circuit during each trace interval; said direct current path providing a voltage on said base of said switching transistor at the end of each trace interval to forward bias said base-emitter circuit thereof and thereby to initiate said retrace interval.

6. Apparatus as claimed in claim 5, wherein a single capacitor is employed to function in said alternating current feedback path and said charging and discharging paths.

7. Apparatus as claimed in claim 5, wherein said direct current feedback path includes first variable resistance means to control the length of said trace interval; said relatively high resistance path includes second variable resistance means to control primarily the slope of said gradually varying voltage on said control terminal and thereby to control the height of said sawtooth current waveform in said magnetic deflection yoke; and said relatively low resistance path includes third variable resistance means to control primarily the initial voltage on said control terminal during each trace interval and thereby to adjust the linearity of said sawtooth current waveform in said magnetic deflection yoke.

8. Apparatus as claimed in claim 5, including a source of synchronizing pulses coupled to said base of said switching transistor, said synchronizing pulses co-operating with the voltage from said feedback paths to control the frequency of said self-oscillating scanning generator.

9. Apparatus as claimed in claim 5, wherein said retrace voltage pulse also is passed in the collector-emitter path of said switching transistor and wherein said direct current path includes a small resistor for developing a sufficiently large potential due to said voltage pulse to momentarily turn on said second transistor means, thereby reducing the magnitude of said retrace voltage pulse.

10. A self-oscillating deflection generator for developing a current of substantially sawtooth waveform in a magnetic deflection yoke, said current having a long trace interval and a short retrace interval, comprising: first transistor means having a first input circuit and a first output circuit; second transistor means having a second input circuit and a second output circuit; DC feedback means interconnecting said second output circuit and said first input circuit thereby producing an oscillatory cycle wherein said first transistor means is operative during said retrace intervals and said second transistor means is operative during said trace intervals; a deflection yoke coupled to said second output circuit, said yoke developing a large retrace voltage pulse responsive to disablement of said transistor means during said oscillatory cycle; a capacitor coupled between said second output circuit and said first input circuit developing, from said retrace voltage pulse, a potential co-operating with said feedback means in establishing said oscillatory cycle; said capacitor also being coupled to said second input circuit; means, including a part of said first input circuit, providing a short time constant charge path for said capacitor during said retrace interval; and means coupled to said second input circuit providing a relatively long time constant discharge path for said capacitor during said trace interval.

11. A deflection generator as set forth in claim 10 wherein said capacitor has impressed thereon a voltage indicative of the current in said yoke, said voltage including an increasing linear portion during said trace interval and a large magnitude opposite polarity pulse portion during said retrace interval; and wherein said first input circuit includes a base-emitter junction of said first transistor means which is heavily forward biased by said pulse portion for rapidly charging said capacitor during said retrace interval.

12. A deflection generator as set forth in claim 11 wherein a portion of said second output circuit is included in both said charge and discharge paths for said capacitor, said capacitor having one terminal supplied with said increasing linear portion during said trace interval to thereby retard discharge thereof and effectively lengthen its discharge time constant.

13. A deflection generator as set forth in claim 12 further including a series array of resistors connected to the other terminal of said capacitor; said second input circuit including a DC connection to a control electrode of said second transistor means; and said series array of resistors including said DC connection whereby the bias on the control electrode of said second transistor means is a function of the voltage of said capacitor.

14. A deflection generator as claimed in claim 13, wherein said DC connection includes a small resistor in a portion of another charge path for said capacitor including a collector-emitter junction of said first transistor means passing said retrace pulse; said resistor developing a sufficient potential drop to momentarily turn on said second transistor means during occurrence of said retrace pulse to limit the magnitude thereof.

15. A deflection generator as set forth in claim 13, wherein said resistance array contains at least one variable resistance element for controlling one aspect of the waveform of current produced in said yoke.

16. A deflection generator as set forth in claim 15, wherein said resistance array includes another variable resistance element for controlling another aspect of said waveform of current, said two variable resistance elements being electrically connected on opposite sides of said DC connection whereby only one is in both a charge and discharge path of said capacitor.

References Cited

UNITED STATES PATENTS

| | | | |
|---|---|---|---|
| 2,964,673 | 12/1960 | Stanley | 315—27 |
| 3,134,928 | 5/1964 | Freedman | 315—27 |

RODNEY D. BENNETT, *Primary Examiner.*

J. G. BAXTER, *Assistant Examiner.*